US009666330B2

(12) United States Patent
Takei et al.

(10) Patent No.: US 9,666,330 B2
(45) Date of Patent: May 30, 2017

(54) POLYURETHANE RESIN COMPOSITION FOR ELECTRICAL INSULATION

(71) Applicants: Sanyu Rec Co., Ltd., Takatsuki (JP); Asahi Kasei Chemicals Corporation, Tokyo (JP)

(72) Inventors: Yoshimichi Takei, Takatsuki (JP); Akira Morisaki, Takatsuki (JP); Takashi Fukuchi, Kawasaki (JP)

(73) Assignee: Sanyu Rec Co., Ltd., Takatsuki-shi (JP)

( * ) Notice: Subject to any disclaimer, the term of this patent is extended or adjusted under 35 U.S.C. 154(b) by 0 days.

(21) Appl. No.: 14/349,783

(22) PCT Filed: Sep. 27, 2012

(86) PCT No.: PCT/JP2012/074861
§ 371 (c)(1),
(2) Date: Apr. 4, 2014

(87) PCT Pub. No.: WO2013/054659
PCT Pub. Date: Apr. 18, 2013

(65) Prior Publication Data
US 2014/0248497 A1    Sep. 4, 2014

(30) Foreign Application Priority Data

Oct. 12, 2011  (JP) ................. 2011-224637

(51) Int. Cl.
| H01B 3/30 | (2006.01) |
| C08G 18/65 | (2006.01) |
| C08G 18/69 | (2006.01) |
| C08G 18/78 | (2006.01) |
| C08G 18/79 | (2006.01) |
| C08G 18/18 | (2006.01) |
| C08G 18/22 | (2006.01) |
| C08G 18/36 | (2006.01) |

(52) U.S. Cl.
CPC ......... *H01B 3/302* (2013.01); *C08G 18/1875* (2013.01); *C08G 18/227* (2013.01); *C08G 18/36* (2013.01); *C08G 18/6576* (2013.01); *C08G 18/69* (2013.01); *C08G 18/7837* (2013.01); *C08G 18/792* (2013.01); *Y10T 428/31551* (2015.04)

(58) Field of Classification Search
CPC .. C08G 18/1875; C08G 18/227; C08G 18/36; C08G 18/6576; C08G 18/69; C08G 18/7837; C08G 18/792; H01B 3/302; Y10T 428/31551
USPC ................................. 428/423.1; 528/60, 65
See application file for complete search history.

(56) References Cited

U.S. PATENT DOCUMENTS

| 5,130,402 A  * | 7/1992 | Akiyama ............... C08G 18/10 524/101 |
| 5,380,792 A  * | 1/1995 | Renk ................... C08G 18/0804 524/840 |
| 2004/0014927 A1* | 1/2004 | Watanabe et al. ............. 528/44 |
| 2010/0216905 A1 | 8/2010 | Kuwamura et al. |

FOREIGN PATENT DOCUMENTS

| CN | 102030881 A | 4/2011 |
| EP | 0566037 A2 | 10/1993 |
| JP | 09-023018 A | 1/1997 |
| JP | 2004-263108 A | 9/2004 |
| JP | 2007-197642 A | 8/2007 |
| JP | 2007269954 A  * | 10/2007 |
| JP | 2008-024828 A | 2/2008 |
| JP | 2008-120998 A | 5/2008 |
| JP | 2010-150472 A | 7/2010 |
| JP | 2010215857 A  * | 9/2010 |
| JP | 2011-001426 A | 1/2011 |
| WO | WO-2009/051114 A1 | 4/2009 |

OTHER PUBLICATIONS

International Search Report dated Nov. 6, 2012, issued for PCT/JP2012/074861.
Extended European Search Report, issued in corresponding European Patent Application No. EP 12840783.0, dated Aug. 28, 2015.

* cited by examiner

*Primary Examiner* — Thao T Tran
(74) *Attorney, Agent, or Firm* — Locke Lord LLP; James E. Armstrong, IV; Nicholas J. DiCeglie, Jr.

(57) ABSTRACT

The invention provides a polyurethane resin composition for electrical insulation that has excellent compatibility between an isocyanate component and a polyol component, and that exhibits excellent heat resistance, moisture resistance, and insulation properties. The polyurethane resin composition for electrical insulation comprises (1) Part A comprising a polyisocyanate component obtained from at least one member selected from the group consisting of aliphatic diisocyanates and alicyclic diisocyanates, and containing one or more isocyanurate groups and one or more allophanate groups; and (2) Part B comprising a polyol component, wherein the polyisocyanate component has a molar ratio, (a)/(b), of isocyanurate groups (a) to allophanate groups (b) of 85/15 to 15/85.

9 Claims, No Drawings

POLYURETHANE RESIN COMPOSITION FOR ELECTRICAL INSULATION

TECHNICAL FIELD

The present invention relates to a polyurethane resin composition for electrical insulation, a sealing member formed of the polyurethane resin composition for electrical insulation, and an electrical component that has been resin-sealed with the sealing member.

BACKGROUND ART

Along with the recent development of high-density and highly integrated electrical and electronic components, there exists a demand for improvement of the reliability of these components.

In particular, not only a moisture-proof property at room temperature but also high reliability even in a high-temperature and wet-heat environment is required of electrical and electronic components used in vehicle engines, water heaters, etc.

For the purpose of protecting such electrical and electronic components from moisture, dust-containing atmosphere, vibration, impact, etc., electrically insulating sealing members have been used. Flexible resins that have low hardness, e.g., silicone-based resins and urethane-based resins, have typically been used as materials for such sealing members.

Silicone-based resins are excellent in heat resistance, flexibility, and low-temperature characteristics. However, silicone-based resins are not necessarily satisfactory in adhesion to materials of electrical components, and the moisture permeability is high. Thus, silicone-based resins are disadvantageous in that the influence of water cannot be fully avoided.

On the other hand, urethane-based resins are inherently excellent in flexibility, abrasion resistance, low-temperature curability, electrical characteristics, and the like, and are thus used for electrically insulating sealing members.

MDI (diphenylmethane diisocyanate) is typically used as an isocyanate component of urethane-based resins. Such urethane-based resins are often poor in heat resistance. Thus, unfortunately, when such urethane-based resins are used as a sealing member of an electrical component, particularly in a severe environment (e.g., in the vicinity of an engine), cracks are likely to appear on the surface of the sealing member over time, and the electrical component cannot be protected from moisture over a prolonged period of time.

As a heat-resistant polyurethane resin composition for electrical components, there have been proposed, for example, aliphatic and/or alicyclic polyurethane resins for sealing solar cells that are electrically connected on a panel (see Patent Document 1).

However, an analysis of the compatibility between the polyisocyanate component and the polyol component is not conducted in Patent Document 1. An isocyanurate ring-containing polyisocyanate has poor compatibility with a polyol component. Thus, the polyurethane resin composition proposed in Patent Document 1 has a drawback in that, when the polyurethane resin composition is used, the resulting cured molded article becomes sticky; and adhesion to an object becomes weak, which leads to a decrease in moisture resistance and insulation properties.

As a heat-resistant polyurethane resin composition in which a polyisocyanate component is compatible with a polyol component, Patent Document 2 proposes a polyurethane resin composition comprising a polybutadiene polyol (A) and a castor oil-based polyol (B) as hydroxyl-containing compounds, and a modified isocyanurate (c) of a polyisocyanate compound as an isocyanate-containing compound. Patent Document 3 proposes a polyurethane resin composition that is obtained by reacting a polyisocyanate (A) with a polybutadiene polyol (B), wherein the 1,2-vinyl structure content in the polybutadiene polyol (B) is more than 85 mol %.

However, in both Patent Documents 2 and 3 as well, an analysis of the polyisocyanate component for obtaining a polyurethane resin composition excellent in compatibility is not fully conducted. Due to the insufficient compatibility between the polyisocyanate component and the polyol component, it cannot be said that heat resistance, moisture resistance, and insulation properties are satisfactorily achieved in the use of such polyurethane resin compositions for electronic components. Therefore, to be suitably used for various electrical components, these polyurethane resin compositions remain to be improved.

CITATION LIST

Patent Literature

Patent Document 1: JP9-023018A
Patent Document 2: JP2011-001426A
Patent Document 3: JP2010-150472A

SUMMARY OF INVENTION

Technical Problem

The present invention has been made in view of the aforementioned circumstances. An object of the present invention is to provide a polyurethane resin composition for electrical insulation that has excellent compatibility between a polyisocyanate component and a polyol component, and that exhibits excellent heat resistance, moisture resistance, and insulation properties.

Solution to Problem

The present inventors conducted extensive research to achieve the above object, and found that when a polyisocyanate component containing isocyanurate group(s) and allophanate group(s) in a specific molar ratio is used as the isocyanate component of a polyurethane resin composition, and this component is used in combination with a polyol component, a polyurethane resin composition having excellent compatibility can be obtained. This makes it possible to produce a polyurethane resin composition for electrical insulation that can achieve the above object. The present invention has been accomplished based on this finding.

More specifically, the present invention provides the polyurethane resin composition for electrical insulation, sealing member, and resin-sealed electrical component described below.

Item 1. A polyurethane resin composition for electrical insulation comprising:

(1) Part A comprising a polyisocyanate component obtained from at least one member selected from the group consisting of aliphatic diisocyanates and alicyclic diisocyanates, and containing one or more isocyanurate groups and one or more allophanate groups; and (2) Part B comprising a polyol component, wherein the polyisocyanate component has a molar ratio, (a)/(b), of isocyanurate groups (a) to allophanate groups (b) in the range of 85/15 to 15/85.

Item 2. The polyurethane resin composition for electrical insulation according to Item 1, wherein the polyisocyanate component has a molar ratio, (a)/(b), of isocyanurate groups (a) to allophanate groups (b) in the range of 75/25 to 25/75.

Item 3. The polyurethane resin composition for electrical insulation according to Item 1 or 2, wherein the polyol component comprises a castor oil-based polyol and a polyol represented by Formula (1) below:

[Chem. 1]

(1)

wherein $R_7$ is a $C_{3-20}$ linear or branched divalent unsaturated aliphatic hydrocarbon group optionally having one or more hydroxyl groups; and m is an integer of 1 to 20.

Item 4. The polyurethane resin composition for electrical insulation according to any one of Items 1 to 3, wherein the polyol component comprises a polybutadiene polyol and a castor oil-based polyol.

Item 5. A sealing member comprising the polyurethane resin composition for electrical insulation of any one of Items 1 to 4.

Item 6. A resin-sealed electrical component sealed using the sealing member of Item 5.

The polyurethane resin composition for electrical insulation of the present invention comprises (1) Part A comprising a polyisocyanate component obtained from at least one member selected from the group consisting of aliphatic diisocyanates and alicyclic diisocyanates, and containing one or more isocyanurate groups and one or more allophanate groups; and (2) Part B comprising a polyol component. The present invention is characterized in that the polyisocyanate component has a molar ratio, (a)/(b), of isocyanurate groups (a) to allophanate groups (b) in the range of 85/15 to 15/85.

The polyurethane resin composition for electrical insulation having the above feature comprises a polyisocyanate component containing isocyanurate group(s) and allophanate group(s) in a specific molar ratio. This prevents reduction of the compatibility between a polyisocyanate component and a polyol component caused by the unduly high polarity of a polyisocyanate component. Such a polyurethane resin composition exhibits excellent compatibility between a polyisocyanate component and a polyol component; therefore, the occurrence of stickiness of resin molded articles can be reduced, and a polyurethane resin composition for electrical insulation having excellent heat resistance, moisture resistance, and insulation properties can be provided.

The polyurethane resin composition for electrical insulation of the present invention is suitably usable as a sealing member to seal various electrical components.

Each component of the polyurethane resin composition for electrical insulation of the present invention is explained in detail below.

The polyurethane resin composition for electrical insulation of the present invention is a two-pack polyurethane resin composition comprising: (1) Part A comprising a polyisocyanate component obtained from at least one member selected from the group consisting of aliphatic diisocyanates and alicyclic diisocyanates, and containing one or more isocyanurate groups and one or more allophanate groups; and (2) Part B comprising a polyol component. Part A and Part B are mixed when used.

Part A

The polyurethane resin composition for electrical insulation of the present invention comprises: Part A comprising a polyisocyanate component obtained from at least one member selected from the group consisting of aliphatic diisocyanates and alicyclic diisocyanates, and containing one or more isocyanurate groups and one or more allophanate groups.

In the present specification, the polyisocyanate component comprises an isocyanurate group represented by Formula (2) below:

[Chem. 2]

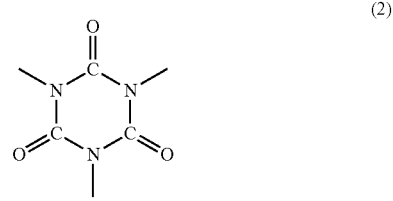

(2)

and an allophanate group represented by Formula (3) below:

[Chem. 3]

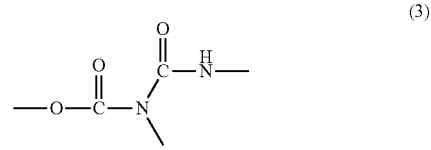

(3)

The polyisocyanate component may comprise both the isocyanurate group and the allophanate group per molecule. Alternatively, as long as the polyisocyanate component comprises both groups as a whole, either of the groups may be present per molecule of the polyisocyanate component. A plurality of these groups may also be present per molecule of the polyisocyanate component.

The molar ratio, (a)/(b), of isocyanurate groups (a) to allophanate groups (b) of the polyisocyanate component ranges from 85/15 to 15/85. For attaining excellent heat resistance, moisture resistance, and compatibility, the molar ratio (a)/(b) is preferably in the range of 75/25 to 25/75, and more preferably in the range of 70/30 to 30/70.

At least one diisocyanate compound selected from the group consisting of aliphatic diisocyanates and alicyclic diisocyanates is used as the material for the polyisocyanate component.

The aliphatic diisocyanate is a compound that contains, when excluding the isocyanate group, chain-like aliphatic hydrocarbons but does not contain aromatic hydrocarbon in the molecule. In contrast, the alicyclic diisocyanate is a compound that contains, in the molecule, cyclic aliphatic hydrocarbons that do not have aromatic property. Use of aliphatic diisocyanate is more preferable because the resulting polyisocyanate component has a low viscosity.

Examples of the aliphatic diisocyanate include butane diisocyanate, pentane diisocyanate, hexamethylene diisocyanate (hereunder referred to as HDI), trimethylhexamethylene diisocyanate, and lysine diisocyanate. Examples of the alicyclic diisocyanate include isophorone diisocyanate, hydrogenated xylylene diisocyanate, hydrogenated diphenylmethane diisocyanate, and 1,4-cyclohexane diisocyanate. Among these, HDI, isophorone diisocyanate, hydrogenated xylylene diisocyanate, and hydrogenated diphenylmethane diisocyanate are preferable since they are easily industrially available. Among those, HDI is particularly preferable since it renders excellent weather resistance and flexibility to the resulting coating film.

Examples of the method for producing an isocyanurate group- and allophanate group-containing polyisocyanate include the following methods. One is such that a plurality of polyisocyanate compounds containing isocyanurate groups and allophanate groups in a specific molar ratio are prepared using at least one diisocyanate compound selected from the group consisting of aliphatic diisocyanates and alicyclic diisocyanates, followed by mixing the polyisocyanate compounds. Another method is such that an isocyanurate group- and allophanate group-containing polyisocyanate is produced from the diisocyanate compounds in a single step.

As the material for the polyisocyanate component, monoalcohol may also be used, or polyhydric alcohols such as diol or triol may also be used. However, the use of monoalcohol is preferable. Among these, the use of $C_{1-20}$ monoalcohol is more preferable. The lower limit of the number of carbons of the monoalcohol is preferably 2, more preferably 3, still more preferably 4, and particularly preferably 6. The upper limit thereof is preferably 16, more preferably 12, and still more preferably 9. The monoalcohol may be used alone, or as a mixture of two or more kinds thereof. In addition, the monoalcohol used in the present invention may contain an ether group, an ester group, or a carbonyl group in the molecule; however, a monoalcohol consisting only of a saturated hydrocarbon group is preferred. Further, more preferred is a branched monoalcohol. Examples of the monoalcohol include methanol, ethanol, 1-propanol, 2-propanol, 1-butanol, 2-butanol, isobutanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol, pentadecanol, palmityl alcohol, stearyl alcohol, cyclopentanol, cyclohexanol, methyl cyclohexanol, and trimethyl cyclohexanol. Among these, isobutanol, n-butanol, isoamyl alcohol, 1-hexanol, 1-heptanol, 1-octanol, 2-ethyl-1-hexanol, tridecanol, pentadecanol, palmityl alcohol, stearyl alcohol, and 1,3,5-trimethyl cyclohexanol are preferable since they have excellent compatibility with a polyol component.

The methods for preparing the polyisocyanate component include the following three methods.

(I) A method for obtaining a polyisocyanate component comprises subjecting a monoalcohol and a diisocyanate to an urethanation reaction, and subsequently or simultaneously performing allophanation and isocyanuration reactions.

(II) A method for obtaining a polyisocyanate component comprises subjecting a monoalcohol and a diisocyanate to an urethanation reaction, and subsequently or simultaneously performing an allophanation reaction to obtain an allophanate group-containing polyisocyanate; subjecting a diisocyanate to an isocyanuration reaction to obtain an isocyanurate group-containing polyisocyanate obtained; and then mixing the allophanate group-containing polyisocyanate with the isocyanurate group-containing polyisocyanate.

(III) A method for obtaining a polyisocyanate component comprises subjecting a monoalcohol and a diisocyanate to an urethanation reaction, subsequently or simultaneously performing an allophanation reaction to obtain an allophanate group-containing polyisocyanate; subjecting a monoalcohol and a diisocyanate to an urethanation reaction, subsequently or simultaneously performing an allophanation and an isocyanuration reaction to obtain an allophanate- and isocyanurate-group containing polyisocyanate; and mixing the allophanate group-containing polyisocyanate with the allophanate- and isocyanurate-group containing polyisocyanate.

Method (I) is advantageous in that the production can be performed in a single process, achieving excellent production efficiency. Methods (II) and (III) are advantageous in that the physical properties of the resulting polyisocyanate component can be easily controlled because polyisocyanate having an isocyanurate structure or polyisocyanate having an isocyanurate and allophanate structure, and a polyisocyanate having an allophanate structure can be mixed in any ratio.

Among methods (I) to (III), methods (I) and (III) are preferable since they can render excellent heat resistance or moisture resistance to the resulting polyurethane resin composition for electrical insulation, and method (I) is more preferable in terms of its excellent production efficiency.

Any of the above methods may be employed as long as the molar ratio of the isocyanurate groups to the allophanate groups is selected in the range of 85/15 to 15/85.

The reaction temperature of the urethanation reaction is preferably 20 to 200° C., more preferably 40 to 150° C., and still more preferably 60 to 120° C. The reaction time is preferably 10 minutes to 24 hours, more preferably 15 minutes to 15 hours, still more preferably 20 minutes to 10 hours. When the temperature is 20° C. or higher, the reaction proceeds rapidly; and when the temperature is 200° C. or lower, side reactions such as urethodionation are suppressed, and coloration is also suppressed. If the reaction time is 10 minutes or longer, the reaction may be completed; and if the reaction time is 24 hours or shorter, side reactions are also suppressed without any production efficiency problems. The urethanation reaction may be carried out in the absence of a catalyst, or in the presence of a catalyst such as a tin catalyst and an amine catalyst.

The allophanation reaction is performed at a temperature preferably in the range of 20 to 200° C., more preferably 40 to 180° C., still more preferably 60 to 160° C., particularly preferably 90 to 150° C., and most preferably 110 to 150° C. When the reaction temperature is 20° C. or higher, the amount of catalyst necessary for the allophanation reaction is reduced, and the time necessary for completion of the reaction can be shortened. When the reaction temperature is 200° C. or lower, side reactions such as urethodionation are suppressed, and the coloration of the reaction product is also suppressed.

The reaction time of the allophanation reaction is preferably 10 minutes to 24 hours, more preferably 15 minutes to 12 hours, still more preferably 20 minutes to 8 hours, and particularly preferably 20 minutes to 6 hours. When the reaction time is 10 minutes or longer, the reaction can be controlled. When the reaction time is 24 hours or shorter, satisfactory production efficiency can be achieved. When the reaction temperature exceeds 130° C., uretdione is generated due to the side reaction; therefore, the reaction time is preferably 8 hours or less, more preferably 6 hours or less, and still more preferably 4 hours or less.

The isocyanuration reaction or the allophanation and isocyanuration reactions are performed at a temperature of preferably 20 to 180° C., more preferably 30 to 160° C., still more preferably 40 to 140° C., particularly preferably 60 to 130° C., and most preferably 80 to 110° C. When the reaction temperature is 20° C. or higher, side reactions such as a nylonization reaction are unlikely to occur as the amount of the catalyst becomes smaller. When the reaction temperature is 180° C. or lower, side reactions such as urethodionation are suppressed, and the coloration of the reaction product is also suppressed.

The isocyanuration reaction, or the allophanation and isocyanuration reactions are performed preferably for 10 minutes to 24 hours, more preferably for 15 minutes to 12 hours, still more preferably for 20 minutes to 8 hours, and particularly preferably for 20 minutes to 6 hours. When the reaction time is 10 minutes or shorter, the reaction can be controlled; and when the reaction time is 24 hours or shorter, a satisfactory production efficiency can be attained.

When the method (I) is employed, the allophanation reaction and the isocyanuration reaction are preferably performed in the presence of a catalyst. In particular, a catalyst that allows a polyisocyanate having a molar ratio of isocyanurate group/allophanate group in the range of 85/15 to 15/85 to be produced is preferably selected. Examples of the catalyst include carboxylates of tetraalkylammonium and hydroxyalkylammonium; hydroxides; aminosilyl group-containing compounds; and mixtures thereof.

When an allophanate group-containing polyisocyanate is produced by employing the method (II) or the method (III), the allophanation reaction is preferably performed using a catalyst. In particular, it is preferable to select a catalyst having a high selection ratio for the allophanate group, and more preferable to select a catalyst so that the molar ratio of the allophanate group to the isocyanurate group of the polyisocyanate generated is in the range preferably from 0/100 to 30/70, more preferably 0/100 to 20/80, and still more preferably 0/100 to 10/90. Examples of the catalyst include carboxylates of lead, zinc, bismuth, tin, zirconyl, and zirconium; and mixtures thereof.

When an isocyanurate group-containing polyisocyanate is produced by employing the method (II), the isocyanuration reaction is preferably performed using a catalyst. Examples of the catalyst include carboxylates of tetraalkylanonium, hydroxyalkylanmonium, and alkali metal salts; hydroxides; aminosilyl group-containing compounds; and mixtures thereof.

When an allophanate group- and isocyanurate group-containing polyisocyanate is produced by employing the above-described method (III), the allophanation reaction and the isocyanuration reaction are preferably performed using a catalyst. Examples of the catalyst include carboxylates of tetraalkylammonium, hydroxyalkylamuonium, and alkali metal salts; hydroxides; aminosilyl group-containing compounds; and mixtures thereof.

The use amount of an allophanation catalyst, an isocyanuration catalyst, and an allophanation and isocyanuration catalyst is suitably selected, relative to the total weight of the reaction liquid, from the range of preferably 0.001 to 2.0% by weight, and more preferably 0.01 to 0.5% by weight. When the weight of the catalyst is 0.001% by weight or more, the effect of the catalyst can be satisfactorily achieved. When the amount thereof is 2% by weight or less, the reaction can be easily controlled.

In the production of the polyisocyanate component, the method for adding an allophanation catalyst, isocyanuration catalyst, and an allophanation and isocyanuration catalyst is not limited. The catalysts may be added before the production of a urethane group-containing compound, i.e., prior to the urethanation reaction of a diisocyanate- and hydroxyl group-containing organic compound, during the urethanation reaction of a diisocyanate- and hydroxyl group-containing organic compound, or after the production of a urethane group-containing compound. The addition may be performed in such a manner that a specific amount of the allophanation catalyst, isocyanuration catalyst, or allophanation and isocyanuration catalyst is collectively added at one time, or added separately several times. Alternatively, a method in which the catalyst is continuously added with a constant speed can be employed.

The urethanation reaction or allophanation reaction, isocyanuration catalyst, or allophanation and isocyanuration catalyst proceed in the absence of solvent; however, if necessary, one or more solvents may be used. Examples of the solvent include ester-based solvents such as ethyl acetate and butyl acetate; ketone-based solvents such as methyl ethyl ketone; aromatic solvents such as toluene, xylene, and diethylbenzene; organic solvents those that are not reactive with an isocyanate group such as dialkyl polyalkylene glycol ether; and mixtures thereof.

The processes of the urethanation reaction, allophanation reaction, isocyanuration reaction, and allophanation and isocyanuration reaction in the production of the polyisocyanate component can be tracked by measuring the NCO content or the refractive index of the reaction solution.

The allophanation reaction, the isocyanuration reaction, and the allophanation and isocyanuration reaction can be stopped by cooling the reaction solution to room temperature or by adding a reaction terminator. However, if a catalyst is used, the use of a reaction terminator is more preferable, as it can reduce the occurrence of side reactions. The amount of the reaction terminator added is preferably 0.25- to 20-fold molar amounts, more preferably 0.5- to 16-fold molar amounts and further more preferably 1.0- to 12-fold molar amounts, relative to the catalyst. The catalyst can be completely deactivated by adding the reaction terminator in an amount of 0.25-fold molar amounts or more of the catalyst. The preservation stability may be improved by adding the reaction terminator in an amount of 20-fold molar amounts or less of the catalyst. Any reaction terminators may be used as long as they can deactivate the catalyst. Examples of the reaction terminators include compounds of phosphoric acids such as phosphoric acid and pyrophosphoric acid, which show acidity; monoalkyl or dialkyl esters of phosphoric acid, pyrophosphoric acid, and the like; halogenoacetic acids such as monochloroacetic acid; benzoyl chloride, sulphonate ester, sulfuric acid, sulfate ester, ion exchange resin, and chelating agents. From an industrial viewpoint, phosphoric acid, pyrophosphoric acid, metaphosphoric acid, polyphosphoric acid and a phosphoric acid monoalkyl ester or a phosphoric acid dialkyl ester are preferable because it is difficult for them to corrode stainless steel. Examples of the phosphoric acid monoester and phosphoric acid diester include phosphoric acid monoethyl ester, phosphoric acid diethyl ester, phosphoric acid monobutyl ester, phosphoric acid dibutyl ester, phosphoric acid mono(2-ethylhexyl)ester, phosphoric acid di(2-ethylhexyl)ester, phosphoric acid monodecyl ester, phosphoric acid didecyl ester, phosphoric acid monolauryl ester, phosphoric acid dilauryl ester, phosphoric acid monotridecyl ester, phosphoric acid di-tridecyl ester, phosphoric acid monooleyl ester, phosphoric acid dioleyl ester, phosphoric acid monotetradecyl ester, phosphoric acid dihexadecyl ester, phosphoric acid monohexadecyl ester, phosphoric acid dihexadecyl ester, phosphoric acid monooctadecyl ester, phosphoric acid dioctadecyl ester, and mixtures thereof.

Alternatively, an adsorbent such as silica gel or activated carbon may be used as a terminator. In this case, the addition amount is preferably 0.05 to 10% by weight based on the diisocyanate used in the reaction.

After completion of the reaction, the unreacted diisocyanate or solvent may be separated from the polyisocyanate component. From the viewpoint of safety, the unreacted diisocyanate is preferably separated. A method for separating the unreacted diisocyanate and the solvent includes a thin film distillation method or a solvent extraction method.

The molar ratio of isocyanurate groups (a) to allophanate groups (b) (i.e., (a)/(b)) in the polyisocyanate component can be obtained by $^1$H-NMR. One example of the method for determining the polyisocyanate composition by $^1$H-NMR, using HDI as a raw material, is described below.

One example of measuring with $^1$H-NMR: The polyisocyanate component is dissolved in deuterated chloroform at a concentration of 10% by weight (addition of 0.03% by weight of tetramethylsilane based on the polyisocyanate component). As the chemical shift standard, the signal of the hydrogen of tetramethylsilane was taken as 0 ppm. Through measurement by means of $^1$H-NMR, a determination is made for a ratio of the peak area of the signal near 8.5 ppm assigned to the hydrogen atom bonded to the nitrogen of the allophanate group (1 mole of hydrogen atom to 1 mole of allophanate group) to the peak area of the signal near 3.8 ppm assigned to the hydrogen atom of the methylene group adjacent to the isocyanurate group (6 moles of hydrogen atom to 1 mole of isocyanurate group). Isocyanurate group/allophanate group=(area near 3.8 ppm/6)/(Signal area near 8.5 ppm)

The isocyanate group content (hereinafter referred to as "NCO content") in the polyisocyanate component is preferably 13 to 22% by weight, in a state where no solvent or diisocyanate is substantially contained. The polyisocyanate compound used in the present invention preferably has a viscosity of 150 to 800 mPa·s, in a state where no solvent or diisocyanate is substantially contained.

Part B

The polyurethane resin composition for electrical insulation of the present invention comprises Part B that contains a polyol component.

Polyol Component

The polyol component is not particularly limited, and any polyol component that is usually used as a polyol component can be used. Examples of the polyol component include a polyol represented by Formula (1) below that has terminal hydroxyl groups:

[Chem. 4]

(1)

wherein $R_7$ is a $C_{3-20}$ linear or branched, saturated or unsaturated, divalent hydrocarbon group optionally having one or more hydroxyl groups; m is an integer of 1 to 20.

As the hydroxy-terminated polyol represented by Formula (1), the use of a polybutadiene polyol is more preferable. An example of the polybutadiene polyol is a polyol having a hydroxyl group at each end, and comprising polybutadiene repeating units having a 1,4 linkage content of 60 to 90 mol % and a 1,2 linkage content of 10 to 40 mol %, wherein the number of the repeating units is 10 to 14.

The polybutadiene polyol preferably has a molecular weight of 800 to 4,800, and more preferably 1,200 to 3,000.

Examples of the polyol component include polybutadiene polyol, ethyleneglycol, 1,3-propanediol, 1,2-propanediol, 2-methyl-1,3-propanediol, 1,4-butanediol, 1,3-butanediol, 1,4-pentanediol, 1,5-pentanediol, 1,6-hexanediol, 1,5-hexandiol, 1,2-hexandiol, 2,5-hexandiol, octanediol, nonanediol, decanediol, diethylene glycol, triethylene glycol, dipropylene glycol, cyclohexanediol, trimethylolpropane, glycerin, 2-methylpropane-1,2,3-triol, 1,2,6-hexanetriol, pentaerythrite, polylactone diol, polylactone triol, ester glycol, polyester polyol, polyether polyol, polycarbonate polyol, acrylic polyol, silicone polyol, fluorine polyol, polytetramethylene glycol, polyethylene glycol, polycaprolactone polyol, hydrides of hydroxyl group-containing liquid polyisoprene, hydrides of hydroxyl group-containing liquid polybutadiene; etc.

It is also possible to use a castor oil-based polyol as the polyol component. Examples of the castor oil-based polyol include castor oil and castor oil derivatives.

Examples of the castor oil derivatives include castor oil fatty acid; hydrogenated castor oils such as those obtained by adding hydrogen to castor oil or castor oil fatty acid; products obtained by an ester interchange reaction of castor oil with other oils; reaction products of castor oil and polyhydric alcohol; esterification products of castor oil fatty acid and polyhydric alcohol; and products obtained by alkylene oxide addition polymerization.

As the castor oil-based polyol, the use of hydrogenated castor oil is preferable.

More preferably, the polyol component contains polybutadiene polyol and castor oil-based polyol. In this case, the proportion of the polybutadiene polyol and castor oil-based polyol is, when the total amount of polybutadiene polyol and castor oil-based polyol is defined as 100% by weight, (polybutadiene polyol):(castor oil-based polyol)=90:10% by weight to 50:50% by weight, and more preferably 90:10% by weight to 70:30% by weight. The use of the polyol component having the above proportion improves the compatibility with polyisocyanate component, lowers the viscosity of the polyurethane resin composition for electrical insulation, and achieves excellent operability.

The polyol component more preferably contains polybutadiene polyol and hydrogenated castor oil.

Another preferable example of the polyol component include one that is obtained by using, as a hydroxy-terminated polyol, a hydroxyl group-containing liquid polybutadiene (produced by Idemitsu Petrochemical Co., Ltd.; hydroxyl group content=0.83 mol/kg, viscosity=7,000 mPa·s (25° C.), product name: Poly bd (registered trademark) R-45HT) and, as a hydrogenated castor oil, a hydrogenated castor oil produced by Itoh Oil Chemicals Co., Ltd, hydroxyl group content=1.67 mol/kg, viscosity=2,200 mPa·s (25° C.), product name: SR-309), and mixing them.

The equivalent ratio NCO/OH of the hydroxyl group (OH) of the polyol component and the isocyanate group (NCO) of the polyisocyanate component is preferably 0.70 to 1.40. Having an equivalent ratio NCO/OH in the above range allows properties as a moisture-proof insulation agent to be exhibited. The equivalent ratio NCO/OH is preferably 0.80 to 1.20, and more preferably 0.85 to 1.05.

(Other Components)

The polyurethane resin composition for electrical insulation of the present invention may contain a plasticizer other than the polyisocyanate component and the polyol component described above.

The plasticizer is not limited, and conventionally known ones can be used. As the plasticizer, the use of a plasticizer that does not have a hydroxyl group is preferable for rendering elasticity to a cured product and lowering the viscosity during the production of the composition. Examples of the plasticizer include phthalate esters such as dioctylphthalate, diisononylphthalate, and diundecylphthalate; trimellitate-based plasticizers such as triethylhexyl trimellitate and triisodecyl trimellitate; and phosphoric esters such as tricresylphosphate, trisxylenylphosphate, cresyldiphenylphosphate, xylenylphosphate, and triphenylphosphate.

Further specific examples of the plasticizer include a diisononyl phthalate (product name: DINP, produced by J-PLUS Co., Ltd.) having a molecular weight of 419.

The plasticizer may be contained in either Part A or Part B, but is preferably contained in Part B.

In order not to inhibit the heat resistance, moisture resistance, and insulation properties of the polyurethane resin composition for electrical insulation of the present invention, the content of the plasticizer is preferably 1 to 50 parts by weight when the total amount of the polyisocyanate component and the polyol component is defined as 100 parts by weight. Having a plasticizer content in the above range allows the compatibility of the polyurethane resin composition for electrical insulation to be improved and the stickiness of the cured resin to be suppressed. If the content of the plasticizer is unduly large, the moisture resistance and/or insulation properties of the cured resin may be lowered.

The polyol component may further contain a filler. By containing a filler, flame retardancy and thermal conductivity can be provided to the polyurethane resin composition for electrical insulation.

The filler is not limited, and examples thereof include aluminium hydroxides.

In order not to hinder the heat resistance, moisture resistance, and insulation properties of the polyurethane resin composition for electrical insulation of the present invention, the content of the filler is preferably in the range of 5 to 80 parts by weight when the total weight of the polyisocyanate component and the polyol component is defined as 100 parts by weight. In order to exhibit improved heat resistance, moisture resistance, and insulation properties, the content of the filler is more preferably in the range of 40 to 60 parts by weight.

The filler may be contained either in Part A or Part B, but is preferably contained in Part B.

The polyurethane resin composition for electrical insulation of the present invention may further comprise other additives. Examples of such additives include low molecular weight polyols for improving physical properties (hydrocarbon-based low molecular weight polyols such as bisphenol-based polyol, aniline-based polyol, and octanediol), viscosity modifiers (such as phthalic acid-based and/or fatty acid-based plasticizer, process oil, silicone oil, paraffin-based oligomer, and olefin-based oligomer), inorganic and/or organic fillers (inorganic fillers such as calcium carbonate, carbon black, clay, hollow filler, rubber powder, resin powder, talc, mica, kaolin, bentonite, silica, alumina, titania, aluminium hydroxide, graphite, glass fiber and carbon fiber; pigments; etc.), stabilizers such as antiaging agent, antioxidant, and ultraviolet absorber; flame retardants (phosphorus-based flame retardants, halogen-based flame retardants, and antimony oxide), defoaming agent and/or surface-treatment agent, curing catalysts (e.g., tin-based, imidazole-based, and amine-based catalysts), etc.

The total amount of the aforementioned other additives is preferably 0.1 to 10.0 parts by weight when the total weight of the polyisocyanate component and the polyol component is defined as 100 parts by weight in order not to hinder the heat resistance, moisture resistance, and insulation properties of the polyurethane resin composition for electrical insulation of the present invention. In order to achieve better heat resistance, moisture resistance, and insulation properties, the total amount thereof is more preferably 0.1 to 5.0 parts by weight.

The aforementioned other additives may be contained in either Part A or Part B, but are preferably contained in Part B.

The polyurethane resin composition for electrical insulation explained above has excellent heat resistance, moisture resistance, and insulation properties; therefore, it is suitably used as a sealing member for electrical components.

Resin-sealed electrical components can be produced by using the sealing member. The resin electrical component sealed by the sealing member exhibits excellent heat resistance, moisture resistance, and insulation properties.

One example of the method for producing the electrical component is such that the polyurethane resin composition for electrical insulation is injected into or applied to an electric panel or other target area, followed by heating at, for example, 60 to 80° C., for 30 to 90 minutes.

Advantageous Effects of Invention

The polyurethane resin composition for electrical insulation of the present invention comprises (1) Part A comprising a polyisocyanate component obtained from at least one member selected from the group consisting of aliphatic diisocyanates and alicyclic diisocyanates, and containing one or more isocyanurate groups and one or more allophanategroups; and (2) Part B comprising a polyol component, wherein the molar ratio, (a)/(b), of isocyanurate groups (a) to allophanate groups (b) of polyisocyanate component is within the specific range. The above feature achieves excellent compatibility between an isocyanate component and a polyol component. This reduces the occurrence of stickiness of resin molded articles, and allows a polyurethane resin composition for electrical insulation having excellent heat resistance, moisture resistance, and insulation properties to be provided, obtaining a polyurethane resin composition for electrical insulation suitably usable for various electrical components.

DESCRIPTION OF EMBODIMENTS

Examples

The following Examples and Comparative Examples describe the present invention in more detail. However, the scope of the invention is not limited thereto.

Synthesis Examples

The following are synthesis examples of the polyisocyanate component.

Herein, the molar ratio (a)/(b) of the isocyanurate groups (a) to the allophanate groups (b) contained in a polyisocyanate component was measured by determining, using $^1$H-NMR ("FT-NMRDPX-400," manufactured by Bruker), the ratio of the isocyanurate groups to the allophanate groups based on the ratio of the peak area of the signal near 8.5 ppm assigned to the hydrogen bonded to the nitrogen atom of the allophanate group to the peak area of the signal near 3.8 ppm assigned to the hydrogen of the methylene group adjacent to the nitrogen atom of the isocyanurate ring of the isocyanurate group.

The NCO content was calculated by neutralizing the isocyanate groups with an excessive amount of 2N amine, followed by back titration with 1N hydrochloric acid.

The viscosity was measured at 25° C. with an E-type viscometer (manufactured by Tokimec. Inc.). A standard rotor (1°34'×R24) was used for measurement. The rotation speed was as follows.

100 r.p.m. (when less than 128 mPa·s)
50 r.p.m. (when 128 mPa·s to 256 mPa·s)
20 r.p.m. (when 256 mPa·s to 640 mPa·s)
10 r.p.m. (when 640 mPa·s to 1,280 mPa·s)
5 r.p.m. (when 1,280 mPa·s to 2,560 mPa·s)

Synthesis Example 1

Synthesis of Polyisocyanate Component A-1

The air in a four-necked flask equipped with a stirrer, a thermometer, and a condenser tube was replaced with nitrogen. 1,200 g of HDI and 0.6 part of isobutanol were fed thereinto, and the temperature inside the reaction apparatus was maintained at 80° C. for 2 hours with stirring. Subsequently, 0.1 g of tetramethylammonium caprate as a catalyst for an isocyanuration reaction was added to the mixture, and the isocyanuration reaction was carried out. When the conversion reached 12%, 0.2 g of phosphoric acid was added thereto to terminate the reaction. The reaction mixture was filtered, and then unreacted HDI was removed at 160° C. (27 Pa) the first time, and at 150° C. (13 Pa) the second time, by the use of a falling film evaporator, thereby giving polyisocyanate component A-1. The resulting polyisocyanate component A-1 was a transparent, pale-yellow liquid. The yield was 230 g, the viscosity at 25° C. was 400 mPa·s, and the NCO content was 22.6%. The molar ratio of the isocyanurate groups to the allophanate groups determined through $^1$H-NMR measurement was 78/22.

Synthesis Example 2

Synthesis of Polyisocyanate Component A-2

1,000 g of HDI and 30 g of 2-ethylhexanol were fed into the same apparatus used in Synthesis Example 1, and the mixture was stirred at 80° C. for 1 hour to carry out an urethanation reaction. 0.36 g of a solution of tetramethylamnonium caprate in n-butanol (solids content: 10%) was added thereto as a catalyst for an allophanation and isocyanuration reaction. After additional stirring for 3 hours, 0.58 g of an aqueous solution of phosphoric acid (solids content: 85%) was added thereto to terminate the reaction. The reaction mixture was filtered, and then unreacted HDI was removed at 160° C. (27 Pa) the first time, and at 150° C. (13 Pa) the second time, by the use of a falling film evaporator, thereby giving polyisocyanate component A-2. The resulting polyisocyanate component A-2 was a transparent, pale-yellow liquid. The yield was 300 g, the viscosity at 25° C. was 450 mPa·s, and the NCO content was 20.6%. The molar ratio of the isocyanurate groups to the allophanate groups determined through $^1$H-NMR measurement was 65/35.

Synthesis Example 3

Synthesis of Polyisocyanate Component A-3

1,000 g of HDI and 30 g of 2-ethylhexanol were fed into the same apparatus used in Synthesis Example 1, and the mixture was stirred at 90° C. for 1 hour to carry out an urethanation reaction. At a temperature of 90° C., 0.6 g of a solution of tetramethylanmonium caprate in isobutanol (solids content: 5%) was added thereto as a catalyst for an allophanation and isocyanuration reaction. After additional stirring for 2 hours, 0.06 g of an 85% phosphoric acid aqueous solution was added to terminate the reaction. The reaction mixture was filtered, and then unreacted HDI was removed in the same manner as in Synthesis Example 1, thereby giving polyisocyanate component A-3. The resulting polyisocyanate component A-3 was a transparent liquid. The yield was 210 g, the viscosity at 25° C. was 340 mPa·s, and the NCO content was 20.3%. The molar ratio of the isocyanurate groups to the allophanate groups determined through $^1$H-NMR measurement was 50/50.

Synthesis Example 4

Synthesis of Polyisocyanate Component A-4

1,000 g of HDI and 50 g of isobutanol were fed into the same apparatus used in Synthesis Example 1, and the mixture was stirred at 90° C. for 1 hour to carry out an urethanation reaction. 0.53 g of a solution of tetramethylammonium caprate in n-butanol (solids content: 10%) was added thereto as a catalyst for an allophanation and isocyanuration reaction. After additional stirring for 3 hours, 0.10 g of an aqueous solution of phosphoric acid (solids content: 85%) was added to terminate the reaction. The reaction mixture was filtered, and then unreacted HDI was removed in the same manner as in Synthesis Example 1, thereby giving polyisocyanate component A-4. The resulting polyisocyanate component A-4 was a transparent, pale-yellow liquid. The yield was 440 g, the viscosity at 25° C. was 450 mPa·s, and the NCO content was 19.6%. The molar ratio of the isocyanurate groups to the allophanate groups determined through $^1$H-NMR measurement was 40/60.

Synthesis Example 5

Synthesis of Polyisocyanate Component A-5

1,000 g of HDI and 100 g of 2-ethylhexanol were fed into the same apparatus used in Synthesis Example 1, and the mixture was stirred at 90° C. for 1 hour to carry out an urethanation reaction. 10 g of a solution of bismuth 2-ethylhexanoate in mineral spirits (solids content: 20%) was added thereto as a catalyst for an allophanation and isocyanuration reaction. After additional stirring for 3 hours, 4.5 g of 2-ethylhexyl phosphate ester was added to terminate the reaction. The reaction mixture was filtered, and then unreacted HDI was removed in the same manner as in Synthesis Example 1, thereby giving polyisocyanate component A-5. The resulting polyisocyanate component A-5 was a transparent, pale-yellow liquid. The yield was 420 g, the viscosity at 25° C. was 160 mPa's, and the NCO content was 17.4%.

The molar ratio of the isocyanurate groups to the allophanate groups determined through ¹H-NMR measurement was 16/84.

Synthesis Example 6

Synthesis of Polyisocyanate Component A-6

500 g of HDI was fed into the same apparatus used in Synthesis Example 1. 0.08 g of tetramethylammonium caprate was added thereto with stirring at 60° C. The reaction proceeded at 60° C. Four hours later, when the conversion to polyisocyanate reached 20% as determined by measuring the isocyanate-group content and refractive index, 0.2 g of phosphoric acid was added thereto to terminate the reaction. The reaction mixture was filtered, and then unreacted HDI was removed in the same manner as in Synthesis Example 1, thereby giving polyisocyanate component A-6. The resulting polyisocyanate component A-6 was a transparent, pale-yellow liquid. The yield was 102 g, the viscosity at 25° C. was 1,400 mPa·s, and the NCO content was 23.4%. The molar ratio of the isocyanurate groups to the allophanate groups determined through ¹H-NMR measurement was 100/0.

Synthesis Example 7

Synthesis of Polyisocyanate Component A-7

561.9 g of HDI and 38.1 g of isobutanol were fed into the same apparatus used in Synthesis Example 1, and the mixture was stirred at 90° C. for 60 minutes to carry out an urethanation reaction. After the temperature was raised to 120° C., 0.28 g of a solution of zirconyl 2-ethylhexanoate in mineral spirits (solids content: 20%) was added thereto as a catalyst for an allophanation reaction. After additional stirring for 60 minutes, 0.097 g of an aqueous solution of phosphoric acid (solids content: 85%) was added to terminate the reaction. The reaction mixture was filtered, and then unreacted HDI was removed in the same manner as in Synthesis Example 1, thereby giving polyisocyanate component A-7. The resulting polyisocyanate component A-7 was a transparent, pale-yellow liquid. The yield was 203 g, the viscosity at 25° C. was 130 mPa·s, and the NCO content was 18.8%. The molar ratio of the isocyanurate groups to the allophanate groups determined through ¹H-NMR measurement was 3/97.

Synthesis Example 8

Synthesis of Polyisocyanate Component A-8

1,000 parts by weight of diphenylmethane diisocyanate having a 4,4'-diphenylmethane diisocyanate content of 99.8 weight percent was fed into a reaction apparatus equipped with a stirrer, a thermometer, an Allihn condenser, and a nitrogen gas inlet tube, and then 12 parts by weight of triethyl phosphate was added thereto with stirring. The temperature was then raised to 190° C. to carry out a carbodiimidation reaction. When the NCO content reached 7.09 mmol/g, the entire reaction apparatus was rapidly cooled to room temperature with ice water to terminate the carbodiimidation reaction. Thereafter, the reaction mixture was aged for 2 days, thereby giving polyisocyanate component A-8. The resulting polyisocyanate component A-8 was a pale-brown liquid. The NCO content was 29.4%.

Synthesis Example 9

Synthesis of Polyisocyanate Component A-9

The polyisocyanate components A-6 and A-7 that were respectively synthesized in Synthesis Examples 6 and 7 were mixed to give a weight ratio of 54/46 (A-6/A-7), thereby giving polyisocyanate component A-9. The resulting polyisocyanate component A-9 was a transparent, pale-yellow liquid. The viscosity at 25° C. was 770 mPa·s, and the NCO content was 21.3%. The molar ratio of the isocyanurate groups to the allophanate groups determined through ¹H-NMR measurement was 50/50.

Synthesis Example 10

Synthesis of Polyisocyanate Component A-10

The polyisocyanate components A-2 and A-7 that were respectively synthesized in Synthesis Examples 2 and 7 were mixed to give a weight ratio of 85/15 (A-2/A-7), thereby giving polyisocyanate component A-10. The resulting polyisocyanate component A-10 was a transparent, pale-yellow liquid. The viscosity at 25° C. was 400 mPa·s, and the NCO content was 20.3%. The molar ratio of the isocyanurate groups to the allophanate groups determined through ¹H-NMR measurement was 50/50.

Example 1

As a polyol having terminal hydroxyl groups, a product available under the trade name Poly bd (registered trademark) R-45HT, manufactured by Idemitsu Kosan Co., Ltd., was provided. As a hydrogenated castor oil, SR-309 (trade name) manufactured by Itoh Oil Chemicals Co., Ltd., was provided. Further, as a plasticizer, diisononyl phthalate (DINP, trade name, manufactured by J-Plus Co., Ltd.) was provided.

These materials were placed into a reaction vessel equipped with a heater, a cooler, and a decompressor according to the formulations shown in Table 1, and dehydrated at 100° C. under a pressure of 10 mmHg or less over a period of 2 hours, thereby giving a polyol component (Part B).

For a polyisocyanate component, polyisocyanate component A-1 synthesized in the above Synthesis Example 1 was provided as Part A.

In accordance with the formulations shown in Table 1, Part A was added to Part B, and the mixture was stirred and defoamed, thereby giving a polyurethane resin composition for electrical insulation. Part A and Part B were mixed in a ratio to provide one equivalent of the active hydrogen contained in the polyol component for each equivalent of the isocyanate groups contained in the polyisocyanate component.

Preparation of Test Pieces

The polyurethane resin composition for electrical insulation prepared according to the procedure described above was poured into a molding die of 130×130×3 mm, and a molding die having an inside diameter of 30 mm and a height of 10 mm. In the case of curing, after being poured into the molding dies, the polyurethane resin composition for electrical insulation was heated at 60° C. for 16 hours, and allowed to stand at room temperature for one day, whereby it was cured.

Example 2

The procedure described in Example 1 was repeated, except that the polyisocyanate component A-2 synthesized in the above Synthesis Example 2 was used as a polyisocyanate component (Part A), thereby giving a polyurethane resin composition for electrical insulation.

Example 3

The procedure described in Example 1 was repeated, except that the polyisocyanate component A-3 synthesized in the above Synthesis Example 3 was used as a polyisocyanate component (Part A), thereby giving a polyurethane resin composition for electrical insulation.

Example 4

The procedure described in Example 1 was repeated, except that the polyisocyanate component A-4 synthesized in the above Synthesis Example 4 was used as a polyisocyanate component (Part A), thereby giving a polyurethane resin composition for electrical insulation.

Example 5

The procedure described in Example 1 was repeated, except that the polyisocyanate component A-5 synthesized in the above Synthesis Example 5 was used as a polyisocyanate component (Part A), thereby giving a polyurethane resin composition for electrical insulation.

Example 6

The procedure described in Example 1 was repeated, except that the polyisocyanate component A-9 synthesized in the above Synthesis Example 9 was used as a polyisocyanate component (Part A), thereby giving a polyurethane resin composition for electrical insulation.

Example 7

The procedure described in Example 1 was repeated, except that the polyisocyanate component A-10 synthesized in the above Synthesis Example 10 was used as a polyisocyanate component (Part A), thereby giving a polyurethane resin composition for electrical insulation.

Comparative Example 1

The procedure described in Example 1 was repeated, except that the polyisocyanate component A-6 synthesized in the above Synthesis Example 6 was used as a polyisocyanate component (Part A), thereby giving a polyurethane resin composition for electrical insulation.

Comparative Example 2

The procedure described in Example 1 was repeated, except that the polyisocyanate component A-7 synthesized in the above Synthesis Example 7 was used as a polyisocyanate component (Part A), thereby giving a polyurethane resin composition for electrical insulation.

Comparative Example 3

The procedure described in Example 1 was repeated, except that the polyisocyanate component A-8 synthesized in the above Synthesis Example 8 was used as a polyisocyanate component (Part A), thereby giving a polyurethane resin composition for electrical insulation.

Evaluation

Test Example 1

Evaluation of Hardness (Initial Hardness)

Following JIS 16253, the JISA hardness of each of the test pieces prepared by curing the polyurethane resin compositions for electrical insulation prepared in Examples 1 to 7 and Comparative Examples 1 to 3 was measured.

A hardness of less than A70 was indicated by O, a hardness in the range of A70 to A80 was indicated by Δ, and a hardness of more than A80 was indicated by x.

Test Example 2

Evaluation of Heat Resistance (Hardness after Heat Resistance Test)

The test pieces prepared by curing the polyurethane resin compositions for electrical insulation prepared in Examples 1 to 7 and Comparative Examples 1 to 3 were further heated at 120° C. for 1,000 hours, and allowed to stand at 23° C. for one hour. Subsequently, the JISA hardness was measured following JIS K6253.

A hardness of less than A70 was indicated by O, a hardness in the range of A70 to A85 was indicated by Δ, and a hardness of more than A85 was indicated by x.

Test Example 3

Evaluation of Insulation Properties (Initial Insulation Properties)

The volume resistivity at 23° C. of each of the test pieces prepared by curing the polyurethane resin compositions for electrical insulation prepared in Examples 1 to 7 and Comparative Examples 1 to 3 was measured.

A resistivity of $10^{11}$ Ω·m or more was indicated by O, and a resistivity of less than $10^{11}$ Ω·m was indicated by x.

Test Example 4

Evaluation of Moisture Resistance (Insulation Properties after Moisture Resistance Test)

The test pieces prepared by curing the polyurethane resin compositions for electrical insulation prepared in Examples 1 to 7 and Comparative Examples 1 to 3 were further treated at 121° C. and at 100% RH in a pressure cooker for 200 hours. The volume resistivity at 23° C. was measured.

A volume resistivity of $10^9$ Ω·m or more was indicated by O, a volume resistivity in the range of $10^8$ Ω·m to less than $10^9$ Ω·m was indicated by Δ, and a volume resistivity of $10^7$ Ω·m or less was indicated by x.

Test Example 5

Evaluation of Compatibility

The test pieces prepared by curing the polyurethane resin compositions for electrical insulation prepared in Examples 1 to 7 and Comparative Examples 1 to 3 were further heated at 120° C. for 1,000 hours. The compatibility was visually examined based on the evaluation criteria shown below.
O: Droplets are not generated.
X: Droplets are generated on the surface of a test piece.
Table 1 shows the results of evaluations conducted in the above Test Examples 1 to 5.

TABLE 1

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Part B | Polyol Having Terminal Hydroxyl Groups (wt %) | 37.0 | 36.0 | 36.0 | 35.0 | 34.0 | 37.0 | 36.0 | 37.0 | 35.0 | 38.0 |
|  | Hydrogenated Castor Oil (wt %) | 9.0 | 9.0 | 9.0 | 9.0 | 9.0 | 9.0 | 9.0 | 9.0 | 9.0 | 9.0 |
|  | Plasticizer (wt %) | 38.0 | 38.0 | 38.0 | 37.0 | 38.0 | 38.0 | 38.0 | 39.0 | 37.0 | 40.0 |
| Part A | A-1 (wt %) | 16.0 |  |  |  |  |  |  |  |  |  |
|  | A-2 (wt %) |  | 17.0 |  |  |  |  |  |  |  |  |
|  | A-3 (wt %) |  |  | 17.0 |  |  |  |  |  |  |  |
|  | A-4 (wt %) |  |  |  | 19.0 |  |  |  |  |  |  |
|  | A-5 (wt %) |  |  |  |  | 19.0 |  |  |  |  |  |
|  | A-6 (wt %) |  |  |  |  |  |  |  | 15.0 |  |  |
|  | A-7 (wt %) |  |  |  |  |  |  |  |  | 19.0 |  |
|  | A-8 (wt %) |  |  |  |  |  |  |  |  |  | 13.0 |
|  | A-9 (wt %) |  |  |  |  |  | 16.0 |  |  |  |  |
|  | A-10 (wt %) |  |  |  |  |  |  | 17.0 |  |  |  |
| Characteristics of Cured Products | Molar Ratio of Isocyanurate Groups to Allophanate Groups; (a)/(b) | 78/22 | 65/35 | 50/50 | 40/60 | 16/84 | 50/50 | 50/50 | 100/0 | 3/97 | — |
|  | NCO/OH | 1.0 | 1.0 | 1.0 | 1.0 | 1.0 | 1.0 | 1.0 | 1.0 | 1.0 | 1.0 |
|  | Evaluation of Hardness | ○ | ○ | ○ | ○ | ○ | ○ | ○ | ○ | ○ | ○ |
|  | Initial Hardness (JISA) | 36 | 34 | 30 | 28 | 26 | 34 | 28 | 40 | 23 | 23 |
|  | Evaluation of Heat Resistance | Δ | ○ | ○ | ○ | ○ | Δ | ○ | X | ○ | X |
|  | Hardness After Heat Resistance Test (JISA) | 70 | 60 | 60 | 60 | 60 | 80 | 65 | 85 | 60 | 90 |
|  | Evaluation of Insulation Properties | ○ | ○ | ○ | ○ | ○ | ○ | ○ | ○ | X | ○ |
|  | Initial Insulation Properties (Resistance Value) ($\Omega \cdot m$) | $10^{11}$ or more | $10^{11}$ or more | $10^{11}$ or more | $10^{11}$ or more | $10^{11}$ or more | $10^{11}$ or more | $10^{11}$ or more | $10^{11}$ or more | $10^{10}$ | $10^{11}$ or more |
|  | Evaluation of Moisture Resistance | ○ | ○ | ○ | ○ | Δ | Δ | ○ | Δ | X | Δ |
|  | Insulation Properties After Moisture Resistance Test (Resistance Value) ($\Omega \cdot m$) | $10^9$ | $10^8$ | $10^9$ | $10^9$ | $10^8$ | $10^8$ | $10^9$ | $10^8$ | $10^7$ | $10^8$ |
|  | Compatibility | ○ | ○ | ○ | ○ | ○ | ○ | ○ | X | ○ | ○ |

The invention claimed is:

1. A polyurethane resin composition for electrical insulation comprising:
   (1) Part A comprising a polyisocyanate component obtained from at least one member selected from the group consisting of aliphatic diisocyanates and alicyclic diisocyanates, and from a $C_{6-9}$ monoalcohol consisting of a saturated hydrocarbon group; and
   the polyisocyanate component containing one or more isocyanurate groups and one or more allophanate groups; and
   (2) Part B comprising a polyol component which comprises a polybutadiene polyol and a castor oil-based polyol,
   wherein the polyisocyanate component has a molar ratio, (a)/(b), of isocyanurate groups (a) to allophanate groups (b) in the range of 85/15 to 15/85.

2. The polyurethane resin composition for electrical insulation according to claim 1, wherein the polyisocyanate component has a molar ratio, (a)/(b), of isocyanurate groups (a) to allophanate groups (b) in the range of 75/25 to 25/75.

3. The polyurethane resin composition for electrical insulation according to claim 1, wherein Part B comprises a plasticizer that does not have a hydroxyl group.

4. The polyurethane resin composition for electrical insulation according to claim 3, wherein the plasticizer is at least one selected from the group consisting of phthalate esters, trimelitate-based plasticizers, and phosphoric esters.

5. The polyurethane resin composition for electrical insulation according to claim 1, wherein the proportion of the polybutadiene polyol and the castor oil-based polyol in part B is in the range of 90:10% by weight to 50:50% by weight.

6. A sealing member comprising the polyurethane resin composition for electrical insulation of claim 1.

7. An electrical component comprising the sealing member of claim 6.

8. A sealing member comprising the polyurethane resin composition for electrical insulation of claim 2.

9. An electrical component comprising the sealing member of claim 8.

* * * * *